United States Patent
Mocanu

(10) Patent No.: US 9,032,496 B2
(45) Date of Patent: May 12, 2015

(54) SECURE SINGLE SIGN-ON

(75) Inventor: Virgiliu Mocanu, Boca Raton, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 146 days.

(21) Appl. No.: 13/407,133

(22) Filed: Feb. 28, 2012

(65) Prior Publication Data

US 2013/0227668 A1  Aug. 29, 2013

(51) Int. Cl.
H04L 29/06 (2006.01)

(52) U.S. Cl.
CPC ........ *H04L 63/0815* (2013.01); *H04L 63/0823* (2013.01)

(58) Field of Classification Search
CPC ....... G06F 21/335; G06F 21/35; G06F 21/41; G06F 21/445; H04L 9/3234; H04L 9/3247; H04L 9/3226
USPC ........................... 726/4, 8; 713/156, 162, 168
See application file for complete search history.

(56) References Cited

U.S. PATENT DOCUMENTS

| 2008/0250502 | A1 | 10/2008 | Sole | |
|---|---|---|---|---|
| 2009/0210934 | A1* | 8/2009 | Innes | 726/7 |
| 2010/0257369 | A1* | 10/2010 | Baker | 713/186 |
| 2011/0010543 | A1* | 1/2011 | Schmidt et al. | 713/168 |
| 2011/0107409 | A1* | 5/2011 | Wilkinson et al. | 726/8 |
| 2011/0321139 | A1* | 12/2011 | Jayaraman et al. | 726/4 |
| 2012/0084570 | A1* | 4/2012 | Kuzin et al. | 713/182 |

OTHER PUBLICATIONS

"Understanding the Remote Desktop Protocol (RDP)," support.microsoft.com/kb/186607, Mar. 27, 2007, Revision: 2.3, pp. 1-2.
"Understanding Enterprise Single Sign-On," msdn.microsoft.com/en-us/library/aa745042(d=printer,v=bts,10).aspx, last visited Jan. 24, 2012, pp. 1-3.
"Trusted computing base," Wikipedia, en.wikipedia.org/wiki/Trusted_computing_base, last visited Feb. 7, 2012, pp. 1-4.
"Single sign-on," Wikipedia, en.wikipedia.org/wiki/Single_sign-on, last visited Jan. 24, 2012, pp. 1-3.
"Overview of SSL/TLS Encryption," Microsoft/TechNet, technet.microsoft.com/en-us/library/cc781476(WS.10.printer).aspx, Jul. 31, 2003, pp. 1-4.
"Kerberos (protocol)," Wikipedia, en.wikipedia.org/wiki/Kerberos_%28protocol%29, last visited Feb. 7, 2012, pp. 1-6.
Stevens, "Howto: Add a Digital Signature to Executables," blog.didierstevens.com/2008 . . . /howto-add-a-digital-signature-to-executables/, Dec. 31, 2008, pp. 1-16.
"Description of the Credential Security Support Provider (CredSSP) in Windows XP Service Pack 3," support.microsoft.com/kb/951608, Jan. 12, 2011, Revision: 4.1, pp. 1-6.
Jun. 5, 2013 International Search Report and Written Opinion issued in International Application No. PCT/US2013/027948.

* cited by examiner

*Primary Examiner* — Hadi Armouche
*Assistant Examiner* — Hee Song
(74) *Attorney, Agent, or Firm* — Banner & Witcoff, Ltd.

(57) ABSTRACT

Systems and methods that provide secure single sign-on are described herein. When a user provides credentials to a client device, the credentials may be intercepted and cached at a secure location, such as within a trusted environment. When a client process, such as a remote desktop program running on the client device, requests the credentials for single sign-on to a server providing remote desktop services, the credentials may be secured, such as within an opaque container that may be accessed only components running in trusted environments, and provided to the client process. The client process may be running in an untrusted environment, such as an operating system session. The client device may forward the secured credentials to a trusted environment in the server, effectuating single sign-on.

18 Claims, 8 Drawing Sheets

SECURE SIGN-ON

FIELD

Aspects described herein relate to computer systems and computer security. More specifically, aspects described herein relate to secure single sign-on, such as in the virtualization context, and provide methods and systems for sending user credentials from a client to a server in a secured manner.

BACKGROUND

Traditionally, personal computers include combinations of operating systems, applications, and user settings, which are each managed individually by owners or administrators on an ongoing basis. However, many organizations are now using desktop virtualization to provide a more flexible option to address the varying needs of their users. In desktop virtualization, a user's computing environment (e.g., operating system, applications, and/or user settings) may be separated from the user's physical computing device (e.g., smartphone, laptop, desktop computer). Using client-server technology, a "virtualized desktop" may be stored in and administered by a remote server, rather than in the local storage of the client computing device.

There are several different types of desktop virtualization systems. As an example, Virtual Desktop Infrastructure (VDI) refers to the process of running a user desktop inside a virtual machine that resides on a server. VDI and other server-based desktop virtualization systems may provide personalized desktops for each user, while allowing for centralized management and security. Servers in such systems may include storage for virtual desktop images and system configuration information, as well as software components to provide the virtual desktops and allow users to interconnect to them. For example, a VDI server may include one or more hypervisors (virtual machine managers) to create and maintain multiple virtual machines, software to manage the hypervisor(s), a connection broker, and software to provision and manage the virtual desktops.

Desktop virtualization systems may be implemented using a single virtualization server or a combination of servers interconnected as a server grid. Multi-server desktop virtualization systems often include additional computing devices and/or shared storage to provide a common system management portal and to maintain global state information. Such systems often use the external shared storage, along with database and enterprise server software within the virtualization servers, to manage the system. In virtualized desktop systems, users separately provide credentials to logon to a server providing virtualization services, hindering user productivity.

SUMMARY

In light of the foregoing background, the following presents a simplified summary of the present disclosure in order to provide a basic understanding of some aspects described herein. This summary is not an extensive overview, and is not intended to identify key or critical elements or to delineate the scope of the claims. The following summary merely presents various described aspects in a simplified form as a prelude to the more detailed description provided below.

In order to address the above shortcomings and additional benefits that will be realized upon reading the disclosure, aspects herein describe a single sign-on system having a client that receives, by a credential provider, a request from a client process for user credentials and queries a client security service for the user credentials. Querying the client security service for the user credentials may include sending, to the client security service, cached user credentials. In some embodiments, a client security service may authenticate a server and after authenticating the server, may secure the user credentials based on the server, e.g., for secure transmission to the server. Securing the user credentials may include encrypting the cached user credentials. Secure user credentials may be sent, through the client process, to the server, and the server may grant access to the client process based on the secure user credentials.

In some embodiments, securing the user credentials may include encrypting the user credentials based on a key agreed upon by the client security service and a server security service. In additional embodiments, the server may include the server security service, and the server may grant access to the client process by querying the server security service to decrypt the encrypted user credentials and confirming the validity of the user credentials.

In yet other embodiments, the credential provider and the client security service may execute in a trusted computing base, while the client process may execute in an untrusted session of an operating system. The client process may be an untrusted process, and the credential provider may authenticate the client process prior to sending the secure user credentials to the client process. Authenticating the client process may include, for example, verifying a digital signature of an executable file associated with the client process (e.g., an executable file loaded by an operating system to create the client process).

For single-sign on, the client may receive the user credentials. Subsequently, the credential provider may intercept the received user credentials and cache the credentials at a location within a trusted computing base. In some embodiments, the user credentials may include a smart card pin.

BRIEF DESCRIPTION OF THE DRAWINGS

Figure 1:
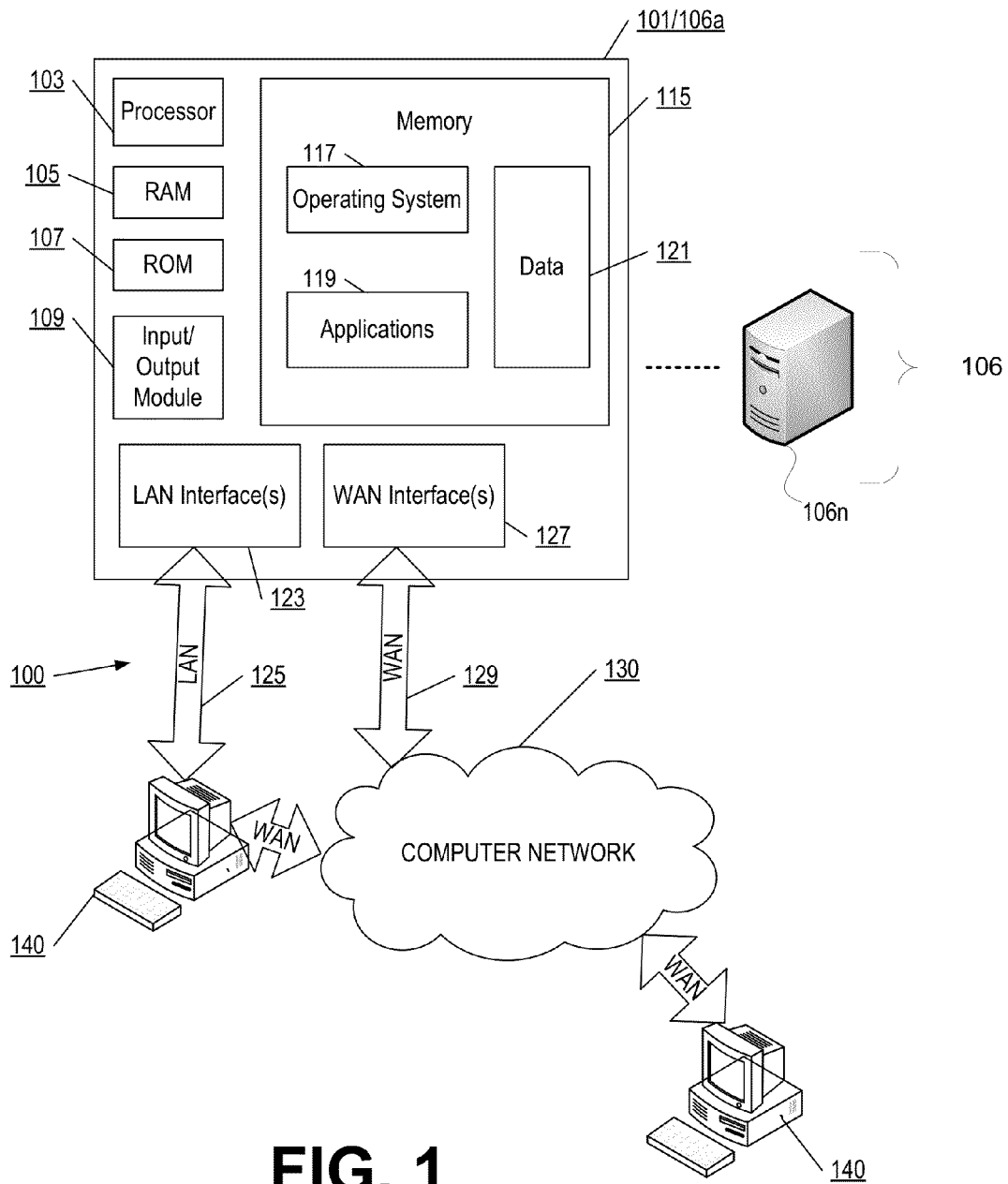

Having thus described aspects of the disclosure in general terms, reference will now be made to the accompanying drawings, which are not necessarily drawn to scale, and wherein:

FIG. 1 illustrates an example operating environment in which various aspects of the disclosure may be implemented.

Figure 2:
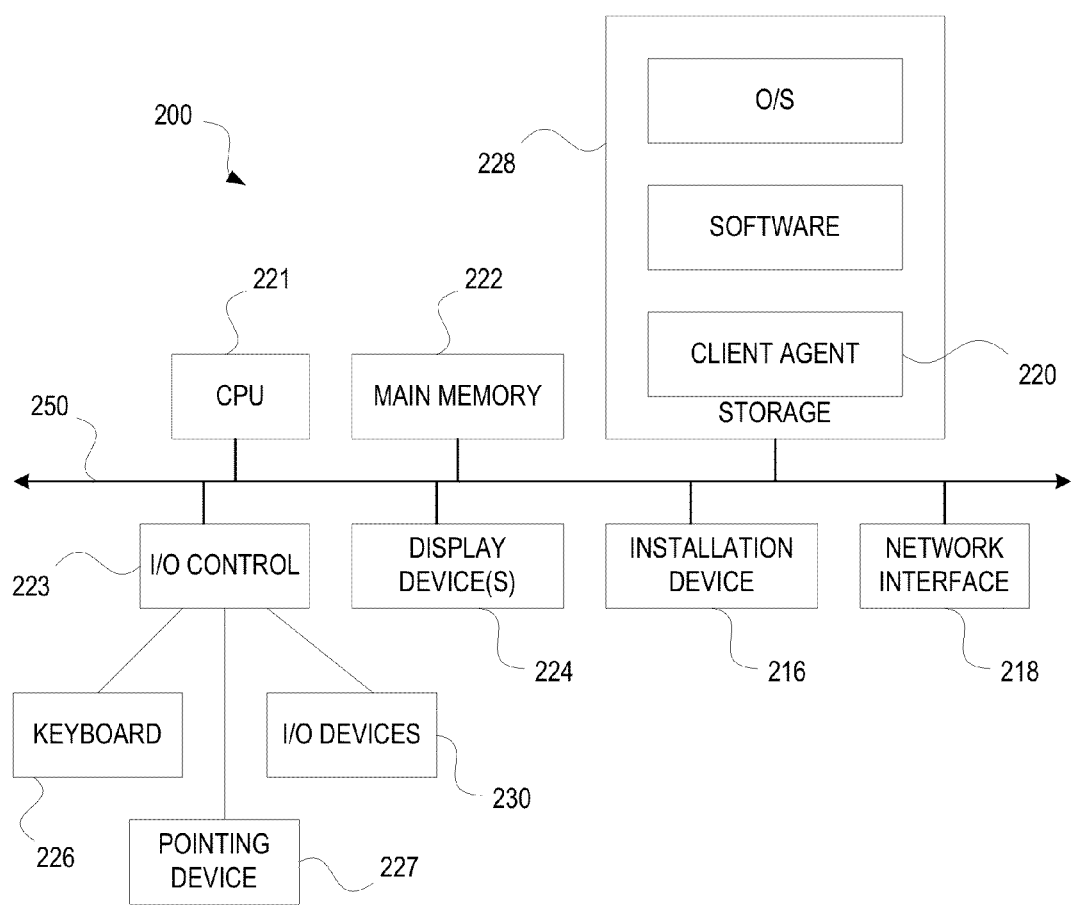

FIG. 2 illustrates a device that may be used in accordance with one or more illustrative aspects described herein.

Figure 3:
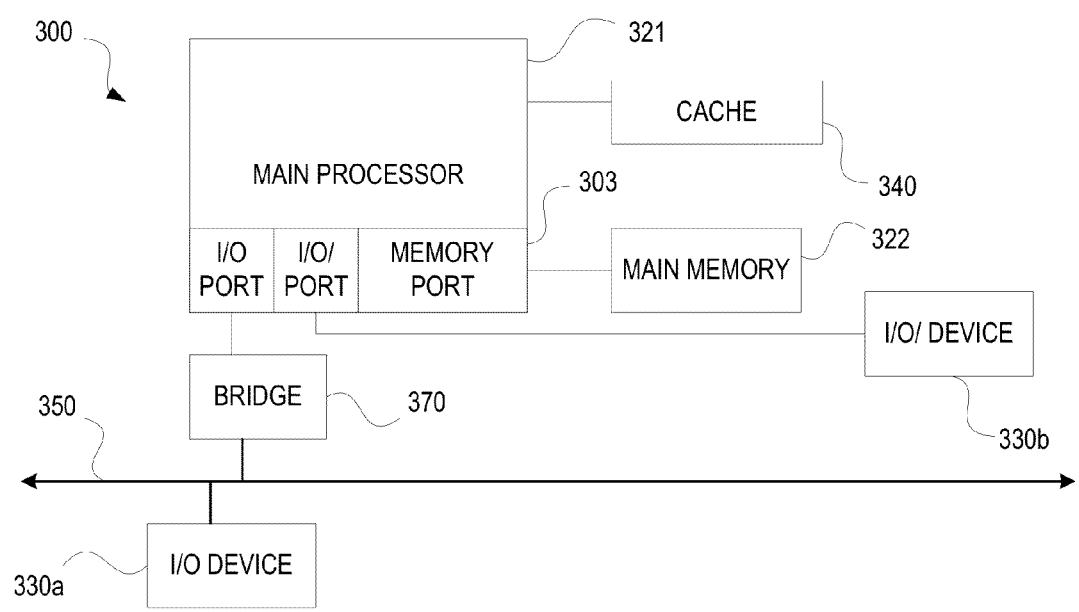

FIG. 3 illustrates a device that may be used in accordance with one or more illustrative aspects described herein.

Figure 4:
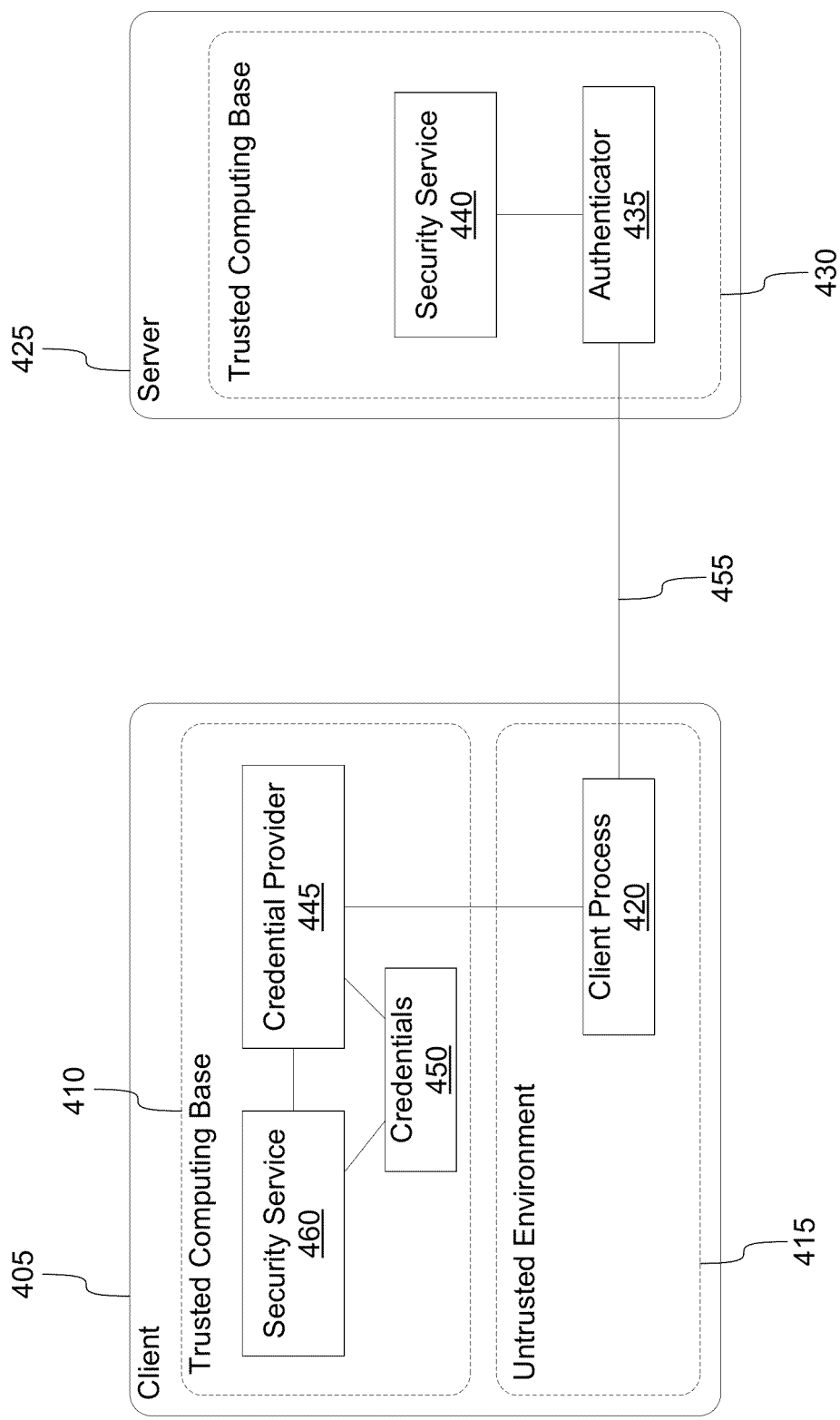

FIG. 4 illustrates an example client and server environment for single sign-on in accordance with one or more illustrative aspects described herein.

Figure 5:
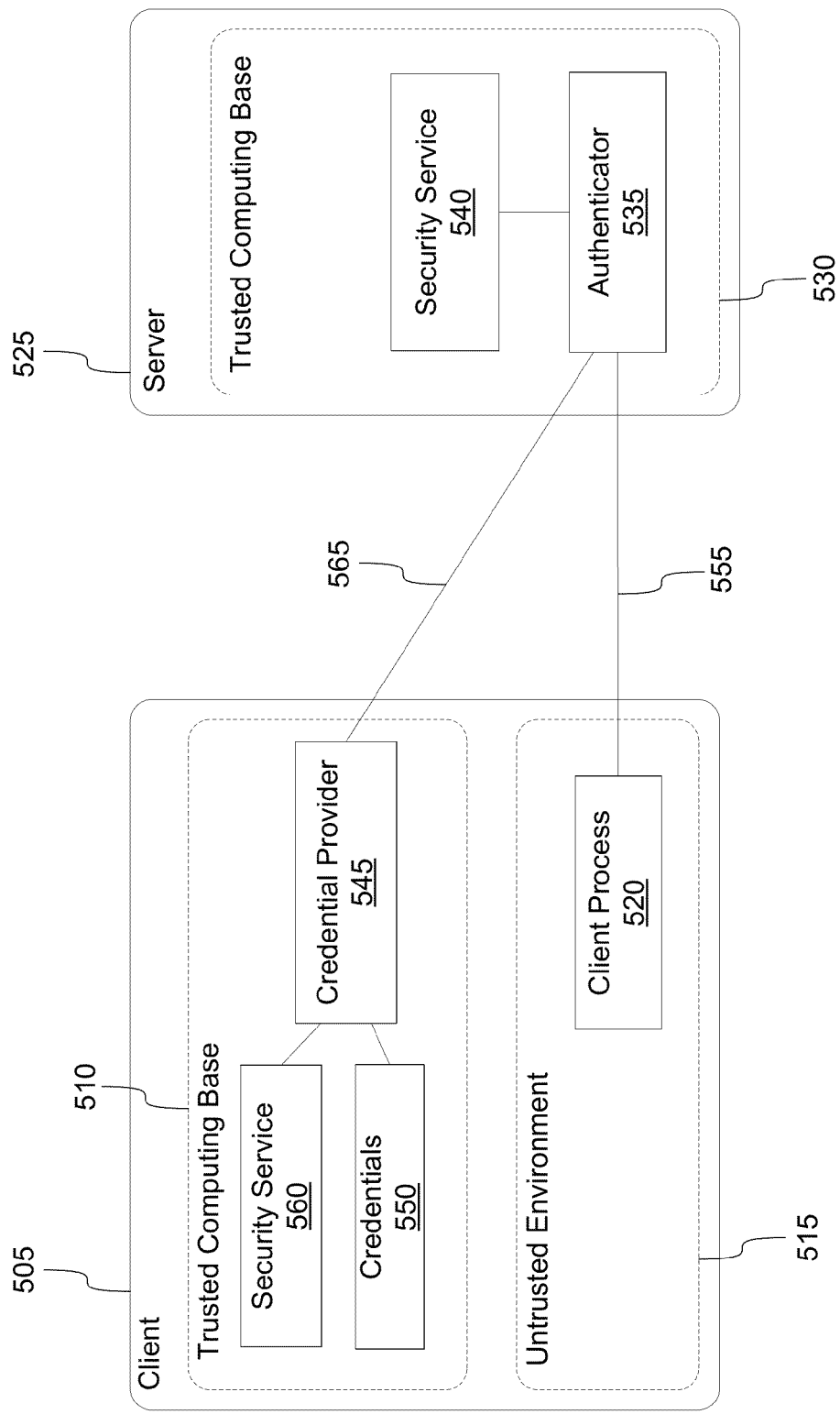

FIG. 5 illustrates another example client and server environment for single sign-on in accordance with one or more illustrative aspects described herein.

Figure 6:
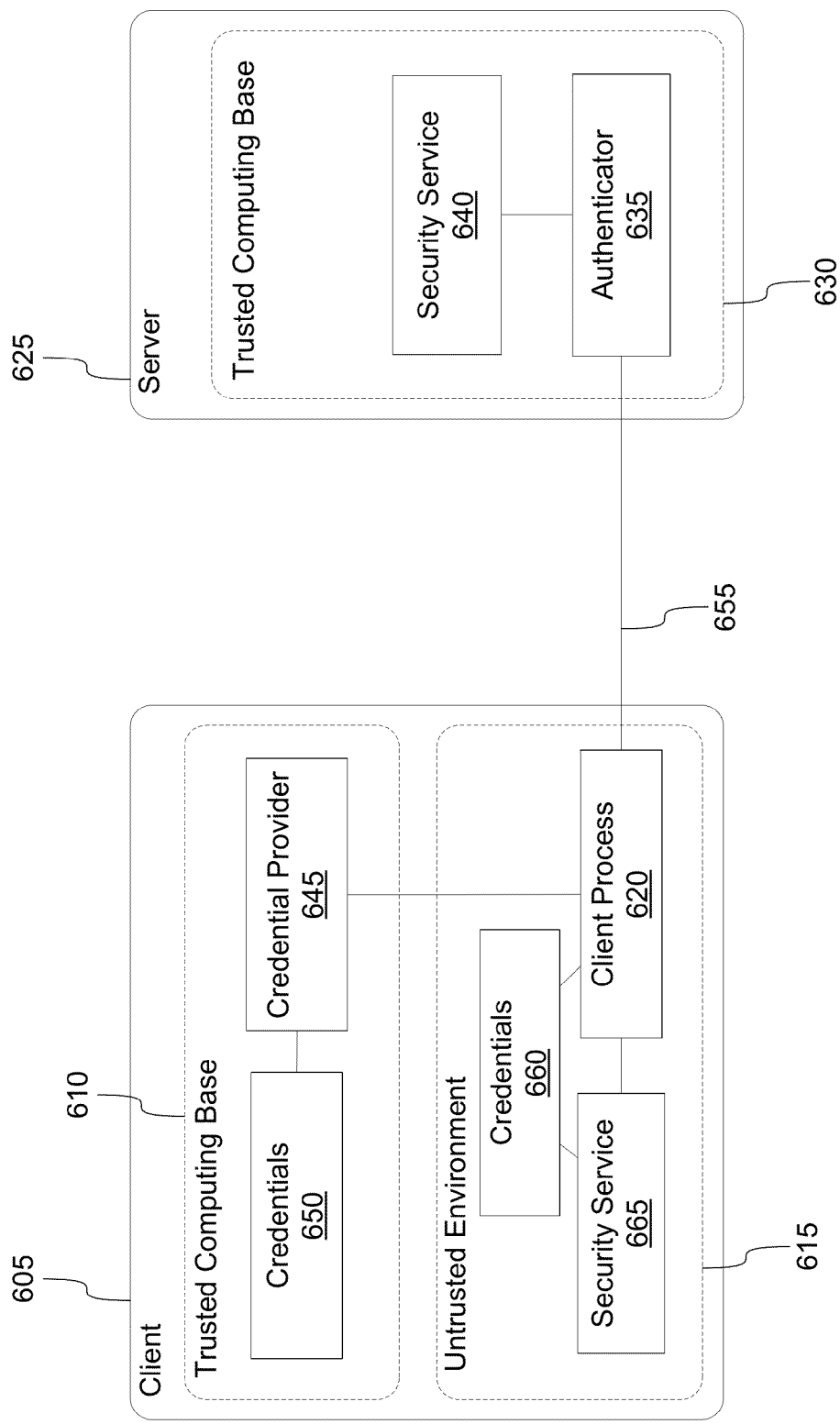

FIG. 6 illustrates an additional example client and server environment for single sign-on in accordance with one or more illustrative aspects described herein.

Figure 7:
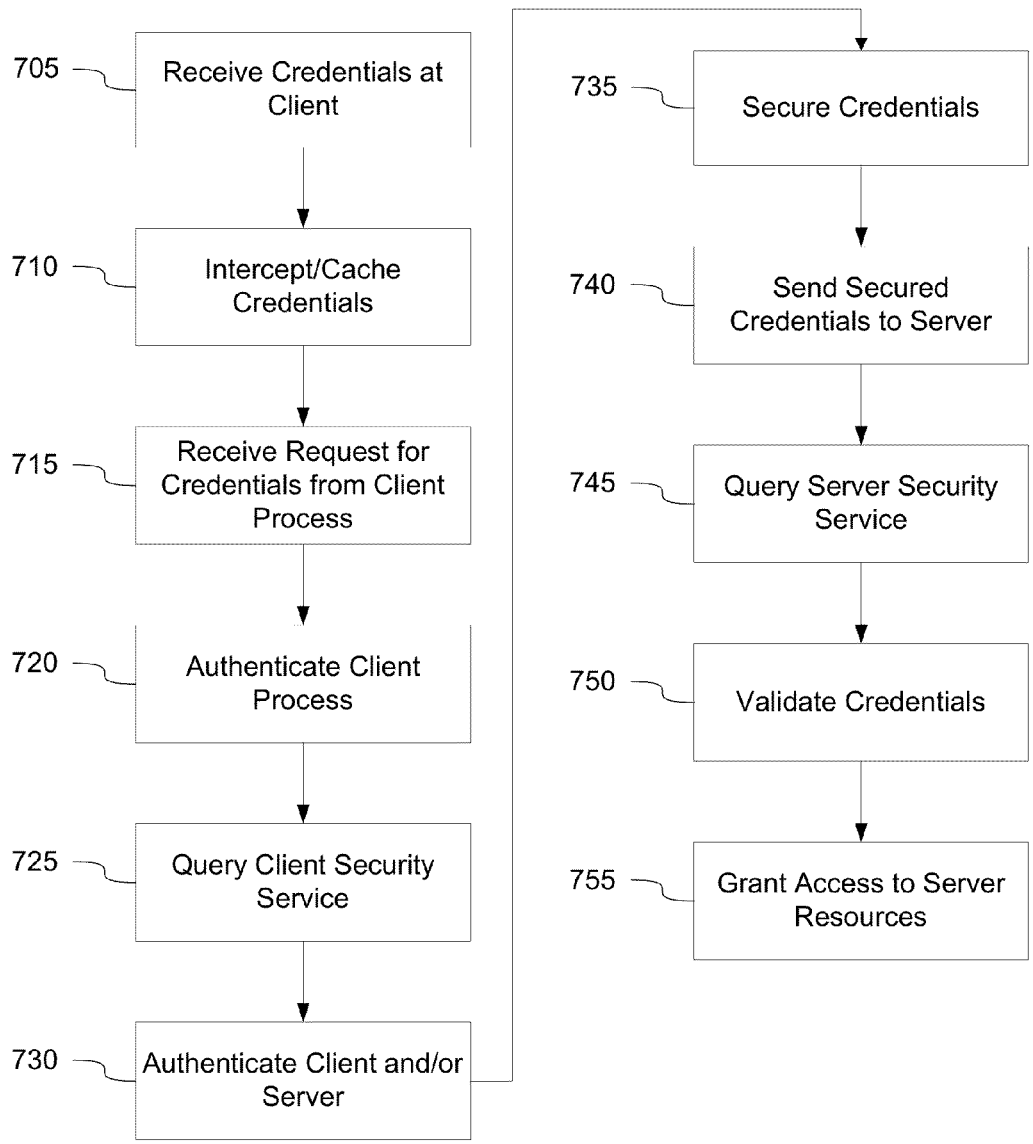

FIG. 7 illustrates an example method of secure single sign-on in accordance with one or more illustrative aspects described herein.

Figure 8:
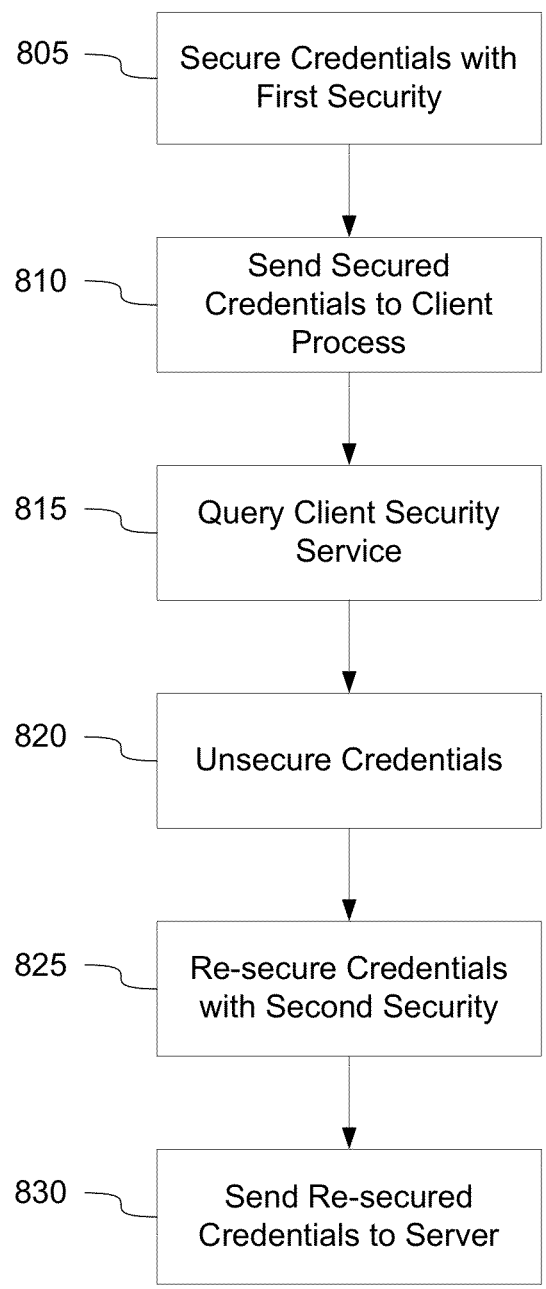

FIG. 8 illustrates another example method of secure single sign-on in accordance with one or more illustrative aspects described herein.

DETAILED DESCRIPTION

In the following description of the various embodiments, reference is made to the accompanying drawings, which form a part hereof, and in which is shown by way of illustration various embodiments in which aspects described herein may be practiced. It is to be understood that other embodiments may be utilized and structural and functional modifications may be made without departing from the scope and spirit of the present disclosure.

As will be appreciated by one of skill in the art upon reading the following disclosure, various aspects described herein may be embodied as a method, a data processing system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

FIG. 1 illustrates an example block diagram of a generic computing device 101 (e.g., a computer server 106a) in an example computing environment 100 that may be used according to one or more illustrative embodiments of the disclosure. According to one or more aspects, generic computing device 101 may be a server 106a in a single-server or multi-server desktop virtualization system configured to provide virtual machines for client access devices. The generic computing device 101 may have a processor 103 for controlling overall operation of the server and its associated components, including random access memory (RAM) 105, read-only memory (ROM) 107, input/output (I/O) module 109, and memory 115.

I/O module 109 may include a mouse, keypad, touch screen, scanner, optical reader, and/or stylus (or other input device(s)) through which a user of generic computing device 101 may provide input, and may also include one or more of a speaker for providing audio output and a video display device for providing textual, audiovisual, and/or graphical output. Software may be stored within memory 115 and/or other storage to provide instructions to processor 103 for enabling generic computing device 101 to perform various functions. For example, memory 115 may store software used by the generic computing device 101, such as an operating system 117, application programs 119, and an associated database 121. Alternatively, some or all of the computer executable instructions for generic computing device 101 may be embodied in hardware or firmware (not shown).

The generic computing device 101 may operate in a networked environment supporting connections to one or more remote computers, such as terminals 140 (also referred to as client devices). The terminals 140 may be personal computers or servers that include many or all of the elements described above with respect to the generic computing device 101. The network connections depicted in FIG. 1 include a local area network (LAN) 125 and a wide area network (WAN) 129, but may also include other networks. When used in a LAN networking environment, the generic computing device 101 may be connected to the LAN 125 through a network interface or adapter 123. When used in a WAN networking environment, the generic computing device 101 may include a modem 127 or other network interface for establishing communications over the WAN 129, such as computer network 130 (e.g., the Internet). It will be appreciated that the network connections shown are illustrative and other means of establishing a communications link between the computers may be used.

Generic computing device 101 and/or terminals 140 may also be mobile terminals (e.g., mobile phones, smartphones, PDAs, notebooks, etc.) including various other components, such as a battery, speaker, and antennas (not shown).

The disclosure is operational with numerous other general purpose or special purpose computing system environments or configurations. Examples of well-known computing systems, environments, and/or configurations that may be suitable for use with the disclosure include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

As shown in FIG. 1, one or more client devices 140 may be in communication with one or more servers 106a-106n (generally referred to herein as "server(s) 106"). In some embodiments, the computing environment 100 may include an appliance installed between the server(s) 106 and client machine(s) 140. The appliance can manage client/server connections, and in some cases can load balance client connections amongst a plurality of backend servers 106.

The client machine(s) 140 can in some embodiments be referred to as a single client machine 140 or a single group of client machines 140, while server(s) 106 may be referred to as a single server 106 or a single group of servers 106. In some embodiments a single client machine 140 communicates with more than one server 106, while in other embodiments a single server 106 communicates with more than one client machine 140. In yet other embodiments, a single client machine 140 communicates with a single server 106.

A client machine 140 can, in some embodiments, be referenced by any one of the following terms: client machine(s) 140; client(s); client computer(s); client device(s); client computing device(s); local machine; remote machine; client node(s); endpoint(s); endpoint node(s); or a second machine. The server 106, in some embodiments, may be referenced by any one of the following terms: server(s), local machine; remote machine; server farm(s), host computing device(s), or a first machine(s).

In some embodiments, the client machine 140 may be a virtual machine. The virtual machine may be any virtual machine, while in some embodiments the virtual machine may be any virtual machine managed by a hypervisor developed by Citrix Systems, IBM, VMware, or any other hypervisor. In some aspects, the virtual machine may be managed by a hypervisor, while in aspects the virtual machine may be managed by a hypervisor executing on a server 106 or a hypervisor executing on a client 140.

The client machine 140 may execute, operate or otherwise provide an application that can be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions. Still other embodiments include a client device 140 that displays application output generated by an application remotely executing on a server 106 or other remotely located machine. In these embodiments, the client device 140 can display the application output in an application window, a browser, or other output window. In one example, the application is a desktop, while in other examples the application is an application that generates a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 106, in some embodiments, executes a remote presentation client or other client or program that uses a thin-client or remote-display protocol to capture display output generated by an application executing on a server 106 and transmits the application display output to a remote client 140. The thin-client or remote-display protocol can be any one of the following protocols: the Independent Computing Architecture (ICA) protocol manufactured by Citrix Systems, Inc. of Ft. Lauderdale, Fla.; or the Remote Desktop Protocol (RDP) manufactured by the Microsoft Corporation of Redmond, Wash.

The computing environment can include more than one server 106A-106N such that the servers 106A-106N are logically grouped together into a server farm 106. The server farm 106 can include servers 106 that are geographically dispersed and logically grouped together in a server farm 106, or servers 106 that are located proximate to each other and logically grouped together in a server farm 106. Geographically dispersed servers 106A-106N within a server farm 106 can, in some embodiments, communicate using a WAN, MAN, or LAN, where different geographic regions can be characterized as: different continents; different regions of a continent; different countries; different states; different cities; different campuses; different rooms; or any combination of the preceding geographical locations. In some embodiments the server farm 106 may be administered as a single entity, while in other embodiments the server farm 106 can include multiple server farms 106.

In some embodiments, a server farm 106 can include servers 106 that execute a substantially similar type of operating system platform (e.g., WINDOWS NT, manufactured by Microsoft Corp. of Redmond, Wash., UNIX, LINUX, or SNOW LEOPARD.) In other embodiments, the server farm 106 can include a first group of servers 106 that execute a first type of operating system platform, and a second group of servers 106 that execute a second type of operating system platform. The server farm 106, in other embodiments, can include servers 106 that execute different types of operating system platforms.

The server 106, in some embodiments, can be any server type. In other embodiments, the server 106 can be any of the following server types: a file server; an application server; a web server; a proxy server; an appliance; a network appliance; a gateway; an application gateway; a gateway server; a virtualization server; a deployment server; a SSL VPN server; a firewall; a web server; an application server or as a master application server; a server 106 executing an active directory; or a server 106 executing an application acceleration program that provides firewall functionality, application functionality, or load balancing functionality. In some embodiments, a server 106 may be a RADIUS server that includes a remote authentication dial-in user service. In embodiments where the server 106 comprises an appliance, the server 106 can be an appliance manufactured by any one of the following manufacturers: the Citrix Application Networking Group; Silver Peak Systems, Inc.; Riverbed Technology, Inc.; F5 Networks, Inc.; or Juniper Networks, Inc. Some embodiments include a first server 106A that receives requests from a client machine 140, forwards the request to a second server 106n, and responds to the request generated by the client machine 140 with a response from the second server 106n. The first server 106A can acquire an enumeration of applications available to the client machine 140 and well as address information associated with an application server 106 hosting an application identified within the enumeration of applications. The first server 106A can then present a response to the client's request using a web interface, and communicate directly with the client 140 to provide the client 140 with access to an identified application.

The server 106 can, in some embodiments, execute any one of the following applications: a thin-client application using a thin-client protocol to transmit application display data to a client; a remote display presentation application; any portion of the CITRIX ACCESS SUITE by Citrix Systems, Inc. like the METAFRAME or CITRIX PRESENTATION SERVER; MICROSOFT WINDOWS Terminal Services manufactured by the Microsoft Corporation; or an ICA client, developed by Citrix Systems, Inc. Another embodiment includes a server 106 that is an application server such as: an email server that provides email services such as MICROSOFT EXCHANGE manufactured by the Microsoft Corporation; a web or Internet server; a desktop sharing server; a collaboration server; or any other type of application server. Still other embodiments include a server 106 that executes any one of the following types of hosted servers applications: GOTOMEETING provided by Citrix Online Division, Inc.; WEBEX provided by WebEx, Inc. of Santa Clara, Calif.; or Microsoft Office LIVE MEETING provided by Microsoft Corporation.

Client machines 140 can, in some embodiments, be a client node that seeks access to resources provided by a server 106. In other embodiments, the server 106 may provide clients 140 or client nodes with access to hosted resources. The server 106, in some embodiments, functions as a master node such that it communicates with one or more clients 140 or servers 106. In some embodiments, the master node can identify and provide address information associated with a server 106 hosting a requested application, to one or more clients 140 or servers 106. In still other embodiments, the master node can be a server farm 106, a client 140, a cluster of client nodes 140, or an appliance.

One or more clients 140 and/or one or more servers 106 can transmit data over a network 130 installed between machines and appliances within the computing environment 100. The network 130 can comprise one or more sub-networks, and can be installed between any combination of the clients 140, servers 106, computing machines and appliances included within the computing environment 100. In some embodiments, the network 130 can be: a local-area network (LAN); a metropolitan area network (MAN); a wide area network (WAN); a primary network 104 comprised of multiple sub-networks located between the client machines 140 and the servers 106; a primary public network 130 (e.g., the Internet) with a private sub-network; a primary private network 130 with a public sub-network; or a primary private network 130 with a private sub-network. Still further embodiments include a network 130 that can be any of the following network types: a point to point network; a broadcast network; a telecommunications network; a data communication network; a computer network; an ATM (Asynchronous Transfer Mode) network; a SONET (Synchronous Optical Network) network; a SDH (Synchronous Digital Hierarchy) network; a wireless network; a wireline network; or a network that includes a wireless link where the wireless link can be an infrared channel or satellite band. The network topology of the network 130 can differ within different embodiments, possible network topologies include: a bus network topology; a star network topology; a ring network topology; a repeater-based network topology; or a tiered-star network topology. Additional embodiments may include a network of mobile telephone networks that use a protocol to communicate among mobile devices, where the protocol can be any one of the following: AMPS; TDMA; CDMA; GSM; GPRS UMTS; or any other protocol able to transmit data among mobile devices.

Illustrated in FIG. 2 is an embodiment of a computing device 200, where the client machine 140 and server 106 illustrated in FIG. 1 may be deployed as and/or executed on any embodiment of the computing device 200 illustrated and described herein. Included within the computing device 200 is a system bus 250 that communicates with the following components: a central processing unit 221; a main memory 222; storage memory 228; an input/output (I/O) controller 223; display devices 224A-224N; an installation device 216; and a network interface 218. In one embodiment, the storage memory 228 includes: an operating system, software routines, and a client agent 220. The I/O controller 223, in some embodiments, is further connected to a keyboard 226, and a pointing device 227. Other embodiments may include an I/O controller 223 connected to more than one input/output device 230A-230N.

FIG. 3 illustrates one embodiment of a computing device 300, where the client machine 140 and server 106 illustrated in FIG. 1 can be deployed as and/or executed on any embodiment of the computing device 300 illustrated and described herein. Included within the computing device 300 is a system bus 350 that communicates with the following components: a bridge 370, and a first I/O device 330a. In another embodiment, the bridge 370 is in further communication with the main central processing unit 321, where the central processing unit 321 can further communicate with a second I/O device 330b, a main memory 322, and a cache memory 340. Included within the central processing unit 321, are I/O ports, a memory port 303, and a main processor.

Embodiments of the computing machine 300 can include a central processing unit 321 characterized by any one of the following component configurations: logic circuits that respond to and process instructions fetched from the main memory unit 322; a microprocessor unit, such as: those manufactured by Intel Corporation; those manufactured by Motorola Corporation; those manufactured by Transmeta Corporation of Santa Clara, Calif.; those manufactured by International Business Machines; a processor such as those manufactured by Advanced Micro Devices; or any other combination of logic circuits. Still other embodiments of the central processing unit 321 may include any combination of the following: a microprocessor, a microcontroller, a central processing unit with a single processing core, a central processing unit with two processing cores, or a central processing unit with more than two processing cores.

While FIG. 3 illustrates a computing device 300 that includes a single central processing unit 321, in some embodiments the computing device 300 can include one or more processing units 321. In these embodiments, the computing device 300 may store and execute firmware or other executable instructions that, when executed, direct the one or more processing units 321 to simultaneously execute instructions or to simultaneously execute instructions on a single piece of data. In other embodiments, the computing device 300 may store and execute firmware or other executable instructions that, when executed, direct the one or more processing units to each execute a section of a group of instructions. For example, each processing unit 321 may be instructed to execute a portion of a program or a particular module within a program.

In some embodiments, the processing unit 321 can include one or more processing cores. For example, the processing unit 321 may have two cores, four cores, eight cores, etc. In some embodiments, the processing unit 321 may comprise one or more parallel processing cores. The processing cores of the processing unit 321, may in some embodiments access available memory as a global address space, or in other embodiments, memory within the computing device 300 can be segmented and assigned to a particular core within the processing unit 321. In some embodiments, the one or more processing cores or processors in the computing device 300 can each access local memory. In still other embodiments, memory within the computing device 300 can be shared amongst one or more processors or processing cores, while other memory can be accessed by particular processors or subsets of processors. In embodiments where the computing device 300 includes more than one processing unit, the multiple processing units can be included in a single integrated circuit (IC). These multiple processors, in some embodiments, can be linked together by an internal high speed bus, which may be referred to as an element interconnect bus.

In embodiments where the computing device 300 includes one or more processing units 321, or a processing unit 321 including one or more processing cores, the processors can execute a single instruction simultaneously on multiple pieces of data (SIMD), or in other embodiments can execute multiple instructions simultaneously on multiple pieces of data (MIMD). In some embodiments, the computing device 100 can include any number of SIMD and MIMD processors.

The computing device 300, in some embodiments, can include a graphics processor or a graphics processing unit (Not Shown). The graphics processing unit can include any combination of software and hardware, and can further input graphics data and graphics instructions, render a graphic from the inputted data and instructions, and output the rendered graphic. In some embodiments, the graphics processing unit can be included within the processing unit 321. In other embodiments, the computing device 300 can include one or more processing units 321, where at least one processing unit 321 is dedicated to processing and rendering graphics.

One embodiment of the computing machine 300 includes a central processing unit 321 that communicates with cache memory 340 via a secondary bus also known as a backside bus, while another embodiment of the computing machine 300 includes a central processing unit 321 that communicates with cache memory via the system bus 350. The local system bus 350 can, in some embodiments, also be used by the central processing unit to communicate with more than one type of I/O device 330a-330n. In some embodiments, the local system bus 350 can be any one of the following types of buses: a VESA VL bus; an ISA bus; an EISA bus; a Micro-Channel Architecture (MCA) bus; a PCI bus; a PCI-X bus; a PCI-Express bus; or a NuBus. Other embodiments of the computing machine 300 include an I/O device 330a-330n that includes a video display 224 that communicates with the central processing unit 321. Still other versions of the computing machine 300 include a processor 321 connected to an I/O device 330a-330n via any one of the following connections: HyperTransport, Rapid I/O, or InfiniBand. Further embodiments of the computing machine 300 include a processor 321 that communicates with one I/O device 330a using a local interconnect bus and a second I/O device 330b using a direct connection.

The computing device 300, in some embodiments, includes a main memory unit 322 and cache memory 340. The cache memory 340 can be any memory type, and in some embodiments can be any one of the following types of memory: SRAM; BSRAM; or EDRAM. Other embodiments include cache memory 340 and a main memory unit 322 that can be any one of the following types of memory: Static random access memory (SRAM), Burst SRAM or Synch-Burst SRAM (BSRAM); Dynamic random access memory (DRAM); Fast Page Mode DRAM (FPM DRAM); Enhanced DRAM (EDRAM), Extended Data Output RAM (EDO RAM); Extended Data Output DRAM (EDO DRAM); Burst Extended Data Output DRAM (BEDO DRAM); Enhanced DRAM (EDRAM); synchronous DRAM (SDRAM); JEDEC SRAM; PC100 SDRAM; Double Data Rate SDRAM (DDR SDRAM); Enhanced SDRAM (ESDRAM); SyncLink DRAM (SLDRAM); Direct Rambus DRAM (DRDRAM); Ferroelectric RAM (FRAM); or any other type of memory. Further embodiments include a central processing unit 321 that can access the main memory 322 via: a system bus 350; a memory port 303; or any other connection, bus or port that allows the processor 321 to access memory 322.

One embodiment of the computing device 200/300 provides support for any one of the following installation devices 216: a CD-ROM drive, a CD-R/RW drive, a DVD-ROM drive, tape drives of various formats, USB device, a bootable medium, a bootable CD, a bootable CD for GNU/Linux distribution such as KNOPPIX, a hard-drive or any other device suitable for installing applications or software. Applications can in some embodiments include a client agent 220, or any portion of a client agent 220. The computing device 200/300 may further include a storage device 228 that can be either one or more hard disk drives, or one or more redundant arrays of independent disks; where the storage device is configured to store an operating system, software, programs applications, or at least a portion of the client agent 220. A further embodiment of the computing device 200, 300 includes an installation device 216 that is used as the storage device 228.

The computing device 200, 300 may further include a network interface 218 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can also be established using a variety of communication protocols (e.g., TCP/IP, IPX, SPX, NetBIOS, Ethernet, ARCNET, SONET, SDH, Fiber Distributed Data Interface (FDDI), RS232, RS485, IEEE 802.11, IEEE 802.11a, IEEE 802.11b, IEEE 802.11g, CDMA, GSM, WiMax and direct asynchronous connections). One version of the computing device 200, 300 includes a network interface 218 able to communicate with additional computing devices 200', 300' via any type and/or form of gateway or tunneling protocol such as Secure Socket Layer (SSL) or Transport Layer Security (TLS), or the Citrix Gateway Protocol manufactured by Citrix Systems, Inc. Versions of the network interface 218 can comprise any one of: a built-in network adapter; a network interface card; a PCM-CIA network card; a card bus network adapter; a wireless network adapter; a USB network adapter; a modem; or any other device suitable for interfacing the computing device 200, 300 to a network capable of communicating and performing the methods and systems described herein.

Embodiments of the computing device 200, 300 include any one of the following I/O devices 230a-230n: a keyboard 226; a pointing device 227; mice; trackpads; an optical pen; trackballs; microphones; drawing tablets; video displays; speakers; inkjet printers; laser printers; and dye-sublimation printers; or any other input/output device able to perform the methods and systems described herein. An I/O controller 223 may in some embodiments connect to multiple I/O devices 230a-230n to control the one or more I/O devices. Some embodiments of the I/O devices 230a-230n may be configured to provide storage or an installation medium 216, while others may provide a universal serial bus (USB) interface for receiving USB storage devices such as the USB Flash Drive line of devices manufactured by Twintech Industry, Inc. Still other embodiments include an I/O device 230 that may be a bridge between the system bus 250 and an external communication bus, such as: a USB bus; an Apple Desktop Bus; an RS-232 serial connection; a SCSI bus; a FireWire bus; a FireWire 800 bus; an Ethernet bus; an AppleTalk bus; a Gigabit Ethernet bus; an Asynchronous Transfer Mode bus; a HIPPI bus; a Super HIPPI bus; a SerialPlus bus; a SCI/LAMP bus; a FibreChannel bus; or a Serial Attached small computer system interface bus.

In some embodiments, the computing machine 200, 300 can connect to multiple display devices 224a-224n, in other embodiments the computing device 100 can connect to a single display device 224, while in still other embodiments the computing device 200, 300 connects to display devices 224a-224n that are the same type or form of display, or to display devices that are different types or forms. Embodiments of the display devices 224a-224n can be supported and enabled by the following: one or multiple I/O devices 230a-230n; the I/O controller 223; a combination of I/O device(s) 230a-230n and the I/O controller 223; any combination of hardware and software able to support a display device 224a-224n; any type and/or form of video adapter, video card, driver, and/or library to interface, communicate, connect or otherwise use the display devices 224a-224n. The computing device 200, 300 may in some embodiments be configured to use one or multiple display devices 224A-224N, these configurations include: having multiple connectors to interface to multiple display devices 224A-224N; having multiple video adapters, with each video adapter connected to one or more of the display devices 224A-224N; having an operating system configured to support multiple displays 224A-224N; using circuits and software included within the computing device 200 to connect to and use multiple display devices 224A-224N; and executing software on the main computing device 200 and multiple secondary computing devices to enable the main computing device 200 to use a secondary computing device's display as a display device 224A-224N for the main computing device 200. Still other embodiments of the computing device 200 may include multiple display devices 224A-224N provided by multiple secondary computing devices and connected to the main computing device 200 via a network.

In some embodiments, the computing machine 200 can execute any operating system, while in other embodiments the computing machine 200 can execute any of the following operating systems: versions of the MICROSOFT WINDOWS operating systems such as WINDOWS 3.x; WINDOWS 95; WINDOWS 98; WINDOWS 2000; WINDOWS NT 3.51; WINDOWS NT 4.0; WINDOWS CE; WINDOWS XP; WINDOWS VISTA; and WINDOWS 7; the different releases of the Unix and Linux operating systems; any version of the MAC OS manufactured by Apple Computer; OS/2, manufactured by International Business Machines; any embedded operating system; any real-time operating system; any open source operating system; any proprietary operating system; any operating systems for mobile computing devices; or any other operating system. In still another embodiment, the computing machine 200 can execute multiple operating systems. For example, the computing machine 200 can execute PARALLELS or another virtualization platform that can execute or manage a virtual machine executing a first operating system, while the computing machine 200 executes a second operating system different from the first operating system.

The computing machine 200 can be embodied in any one of the following computing devices: a computing workstation; a desktop computer; a laptop or notebook computer; a server; a handheld computer; a mobile telephone; a portable telecommunication device; a media playing device; a gaming system; a mobile computing device; a netbook; a device of the IPOD family of devices manufactured by Apple Computer; any one of the PLAYSTATION family of devices manufactured by the Sony Corporation; any one of the Nintendo family of devices manufactured by Nintendo Co; any one of the XBOX family of devices manufactured by the Microsoft Corporation; or any other type and/or form of computing, telecommunications or media device that is capable of communication and that has sufficient processor power and memory capacity to perform the methods and systems described herein. In other embodiments the computing machine 100 can be a mobile device such as any one of the following mobile devices: a JAVA-enabled cellular telephone or personal digital assistant (PDA), such as the i55sr, i58sr, i85s, i88s, i90c, i95cl, or the im1100, all of which are manufactured by Motorola Corp; the 6035 or the 7135, manufactured by Kyocera; the i300 or i330, manufactured by Samsung Electronics Co., Ltd; the TREO 180, 270, 600, 650, 680, 700p, 700w, or 750 smart phone manufactured by Palm, Inc; any computing device that has different processors, operating systems, and input devices consistent with the device; or any other mobile computing device capable of performing the methods and systems described herein. In still other embodiments, the computing device 200 can be any one of the following mobile computing devices: any one series of Blackberry, or other handheld device manufactured by Research In Motion Limited; the iPhone manufactured by Apple Computer; Palm Pre; a Pocket PC; a Pocket PC Phone; or any other handheld mobile device.

In some embodiments, the computing device 200 may have different processors, operating systems, and input devices consistent with the device. For example, in one embodiment, the computing device 200 is a TREO 180, 270, 600, 650, 680, 700p, 700w, or 750 smart phone manufactured by Palm, Inc. In some of these embodiments, the TREO smart phone is operated under the control of the PalmOS operating system and includes a stylus input device as well as a five-way navigator device.

In other embodiments the computing device 200 is a mobile device, such as a JAVA-enabled cellular telephone or personal digital assistant (PDA), such as the i55sr, i58sr, i85s, i88s, i90c, i95c1, or the im1100, all of which are manufactured by Motorola Corp. of Schaumburg, Ill., the 6035 or the 7135, manufactured by Kyocera of Kyoto, Japan, or the i300 or i330, manufactured by Samsung Electronics Co., Ltd., of Seoul, Korea. In some embodiments, the computing device 200 is a mobile device manufactured by Nokia of Finland, or by Sony Ericsson Mobile Communications AB of Lund, Sweden.

In still other embodiments, the computing device 200 is a Blackberry handheld or smart phone, such as the devices manufactured by Research In Motion Limited, including the Blackberry 7100 series, 8700 series, 7700 series, 7200 series, the Blackberry 7520, or the Blackberry Pearl 8100. In yet other embodiments, the computing device 200 is a smart phone, Pocket PC, Pocket PC Phone, or other handheld mobile device supporting Microsoft Windows Mobile Software. Moreover, the computing device 200 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

In some embodiments, the computing device 200 is a digital audio player. In one of these embodiments, the computing device 200 is a digital audio player such as the Apple IPOD, IPOD Touch, IPOD NANO, and IPOD SHUFFLE lines of devices, manufactured by Apple Computer of Cupertino, Calif. In another of these embodiments, the digital audio player may function as both a portable media player and as a mass storage device. In other embodiments, the computing device 200 is a digital audio player such as the DigitalAudioPlayer Select MP3 players, manufactured by Samsung Electronics America, of Ridgefield Park, N.J., or the Motorola m500 or m25 Digital Audio Players, manufactured by Motorola Inc. of Schaumburg, Ill. In still other embodiments, the computing device 200 is a portable media player, such as the Zen Vision W, the Zen Vision series, the Zen Portable Media Center devices, or the Digital MP3 line of MP3 players, manufactured by Creative Technologies Ltd. In yet other embodiments, the computing device 200 is a portable media player or digital audio player supporting file formats including, but not limited to, MP3, WAV, M4A/AAC, WMA Protected AAC, RIFF, Audible audiobook, Apple Lossless audio file formats and .mov, .m4v, and .mp4MPEG-4 (H.264/MPEG-4 AVC) video file formats.

In some embodiments, the computing device 200 comprises a combination of devices, such as a mobile phone combined with a digital audio player or portable media player. In one of these embodiments, the computing device 200 is a Motorola RAZR or Motorola ROKR line of combination digital audio players and mobile phones. In another of these embodiments, the computing device 200 is an iPhone smartphone, manufactured by Apple Computer of Cupertino, Calif.

FIGS. 1-3 show a high-level architecture of an illustrative desktop virtualization system. As shown, the desktop virtualization system may be single-server or multi-server system, including at least one virtualization server 106 configured to provide virtual desktops and/or virtual applications to one or more client access devices 140. As used herein, a desktop refers to a graphical environment or space in which one or more applications may be hosted and/or executed. A desktop may include a graphical shell providing a user interface for an instance of an operating system in which local and/or remote applications can be integrated. Applications, as used herein, are programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

The systems and architectures described above with reference to FIGS. 1-3, as well as other systems and architectures, may be used to implement the functionality described below. Generally, in a single sign-on (SSO) system, a user may provide credentials (e.g., via an input device of a client device) once when first logging in to a computer or network and may be granted access to multiple systems without having to provide the credentials again. In some embodiments, SSO may require user credentials to be the same across all systems implementing SSO. In some embodiments, a user may initially provide credentials when logging on to a client device or network. When the user subsequently accesses a remote desktop application, the user's credentials may be automatically provided to a client or server running the remote desktop, such that SSO enhances the user's productivity by expediting the connection time to the remote desktop. In a multiple sign-on system, on the other hand, the user may be required to provide credentials both when logging on to the client device and when logging on to a server to access a remote application or desktop, reducing the user's productivity.

In a SSO system, information, such as user credentials, are kept secure. User credentials may be secured by keeping the credentials within a trusted computing base (TCB) and/or transmitting the credentials in a secured (e.g., encrypted) format when the credentials leave the TCB. The TCB may capture and store credentials at any time, such as when credentials are initially provided to a client device during sign on or during a setup process. A client process (e.g., a remote desktop program running on the client device), which runs in an untrusted operating system session of the client device, may request user credentials from the TCB in order to implement SSO with a server and processes included therein. In response to the request, the TCB may authenticate the client process and the server. After authentication, the TCB may secure the credentials, such as in an opaque container, and send the secured credentials to a server TCB. An opaque container may store any type of data, including, but not limited to, user credentials and authentication messages. The container is said to be opaque because the contents stored therein are not visible and/or usable without appropriate authorization or security. In some embodiments, software, hardware, and/or firmware components may extract the data stored in the opaque container using a key, such as an encryption or decryption key. Components that cannot extract the data or otherwise unlock the opaque container might not know the contents of the opaque container. Instead, these components might only know the length of the container, the fact that the container stores data, and/or data included in some header fields of the container (e.g., to identify the destination of the opaque container). Opaque containers may include, for example, HTTP payloads, TCP payloads, UDP payloads, etc. In some embodiments, the secured credentials never leave the TCB (client or server) unsecured. Once the credentials have been validated by the server, the server may grant the client process access to server resources (e.g., for services supporting a remote desktop environment).

FIG. 4 illustrates an example client 405 and server 425 environment for single sign-on in accordance with one or more illustrative aspects described herein. In some embodiments, client 405 may be one of client devices 140 illustrated in FIG. 1. Client 405 may include a trusted computing base (TCB) 410. TCB 410 may include hardware, firmware, and/or software components that are trusted and secure and/or that execute at elevated privileges. In some embodiments, TCB 410 may perform security-critical functions, including storing important and/or otherwise confidential information, securing information by generating opaque containers that contain the information and/or otherwise encrypting the information, communicating with other TCB components through untrusted environments using secured communication means, such as cryptography, and providing other services and/or policies critical to security.

Several elements, including credential provider 445 and security service 460, may run within TCB 410. In some embodiments, credential provider 445 may be provided by a developer (e.g., within CtxKerbHook.dll by Citrix Systems, Inc.) to cache credentials provided by the client. Credential provider 445 may intercept (e.g., receive) user credentials. In some embodiments, when a user provides credentials to the client device (e.g., by inputting the credentials through I/O device 230 of computing device 200), credential provider 445 may intercept and/or store (e.g., cache) the credentials, such as within TCB 410. In other embodiments, credential provider 445 may similarly intercept and/or store credentials provided by the user to unlock a smart card or other security card with embedded chips. The card(s) may take any form or shape. When a smart card is inserted into a reader (or brought within the proximity of a reader for contactless smart cards) of client device 405, the smart card may communicate with one or more components in client device 405 to authenticate the user. During this user authentication process, credential provider 445 may intercept and/or store the credentials (e.g., user PIN). In some embodiments, the credential provider may store the credentials only if user authentication succeeds. Credential provider 445 may function as a proxy credential provider by storing the credentials and providing the credentials when the credentials are requested.

Credential provider 445 may cache the user credentials as credentials 450, as illustrated in FIG. 4. Credentials 450 may be cached at a location within, maintained by, or accessible by TCB 410. Furthermore, credentials 450 may be cached in such a way as to preserve their accessibility to credential provider 445 and/or security service 460, as will be further described in the examples below. Credentials may include any piece of information used to identify and/or authenticate a holder of the credentials, such as a user. For example, credentials include, but are not limited to, user identity (e.g., user number, username, etc.) and/or password, personal identification number (PIN), smart card identity, security certificates (e.g., a public key certificate), and features of the user (e.g., as captured by a sensor, such as a fingerprint reader, iris scan, voice recognizer, or other biometric, etc.). The credentials may be stored in a secured format. For example, credential provider 445 may cause credentials 450 to be encrypted prior to storage.

TCB 410 may also include a client-side security service component 460. In some embodiments, client-side security service 460 may facilitate secured communication of user credentials through untrusted environments. For example, client-side security service 460 may be queried, such as by credential provider 445, for services to facilitate transmission of user credentials securely from client 405 to server 425. Furthermore, client-side security service 460 may facilitate authentication of server 425. Similar authentication steps may be performed on client 405, such as by server-side authenticator 435 and server-side security service 440, as will be described in further detail in the examples below. After server 425 and/or client 405 have been authenticated, client-side security service 460 may secure the user credentials. For example, security service 460 may generate an opaque container having the encrypted user credentials contained therein. In some embodiments, only components that have a matching decryption key may unlock the opaque container to access the user credentials included therein. These components may include components running in client-side TCB 410 or server-side TCB 430. In additional embodiments, only client-side security service 460 and server-side security service 440 may have the encryption and/or decryption keys to access the credentials. In some embodiments, client-side and server-side security services 460 and 440 may agree on encryption and/or decryption key(s) used after authentication of server 425 and/or client 405, but prior to transmission of the secured user credentials. For example, the security services 460 and 440 may rely on standard cryptographic protocols (e.g., TLS, SSL, etc.) to negotiate a shared symmetric key used for encryption/decryption.

Security service 460 may use various types of encryption to secure information, including TLS, SSL, a Common Gateway Protocol, and/or any other cryptographic protocol. Security service 460 may additionally rely on handshaking functionalities included in the cryptographic protocols to perform authentication. In some embodiments, encryption/decryption keys may be symmetrical and may be discarded after one use (e.g., after an instance of encrypting and/or decrypting user credentials). For example, the client may discard the key immediately after sending secured credentials to the server. Generally, components without a proper key will not have access to information included in the opaque containers. The authentication steps (performed prior to sending credentials) may similarly be performed by sending and receiving opaque containers so that intermediate untrusted components (e.g., components outside of TCB, such as client process 420) do not know the content of the opaque containers, such as whether the containers include authentication messages or user credentials. Client-side security service 460 may work with server-side security service 440 for authentication and for communicating the user credentials. In some embodiments, client-side security service 460 may send the opaque container including the encrypted user credentials to credential provider 445 (or any other component querying security service 460), which in turn, may forward the container to the server. Security services 460 and/or 440 may, in some embodiments, be services provided by the device operating system. For example, security services 460 and/or 440 may be a WINDOWS Credential Security Support Provider (CredSSP). Alternatively, server 425 may be accessed by using a server-side SSP.

Client 405 may also include an untrusted computing environment 415. In some embodiments, untrusted computing environments may include environments prone to malicious software (malware) attacks. Untrusted environment 415 may include any hardware, firmware, and/or software components outside of the trusted computing base. For example, untrusted environment 415 may be an untrusted operating system (OS) session, such as a WINDOWS (or UNIX, MAC OS, etc.) session. In some embodiments, a logon session may be created after a user authenticates with the OS, such as by signing in with user credentials. As previously discussed, the user credentials may additionally be intercepted and/or cached by credential provider 445 upon the user providing the credentials for the logon session. After a session is created, the user may launch applications within the session, including client process 420. Client process 420 may include a virtualization session application, such as an ICA (e.g., Citrix ICA client), to facilitate communications between client 405 and server 425 such that server 425 provides virtualization (e.g., virtual application, desktop, etc.) services to client 405. Client process 420 may also have one or more executable files associated therewith. In some embodiments, the applications running within the OS session may be untrusted because they run in an untrusted environment. Accordingly, confidential information, such as user credentials, may be secured (e.g., provided in an opaque container, encrypted, etc.) prior to the credentials entering the untrusted environment.

Server 425 may also include a trusted computing base (TCB) 430. As previously described with respect to client-side TCB 410, server-side TCB 430 may generally include hardware, firmware, and/or software components that are trusted and secure and/or that execute at elevated privileges. Several elements, including authenticator 435 and security service 440, may run within TCB 430. In some embodiments, authenticator 435 may be provided by a developer (e.g., Citrix Systems, Inc.). Because authenticator 435 runs within TCB 430, authenticator 435 may be a trusted component that runs at elevated privileges. Authenticator 435 may facilitate authentication of client 405 and components included therein (e.g., credential provider 445, client process 420, etc.). For example, authenticator 435 may proxy opaque containers exchanged between client process 420 and server-side security service 440. Authenticator 435 may also inform other server components (e.g., components configured to provide virtualization resources) that the credentials provided by client process 420 are valid and provide the user's identity to the server components to facilitate providing virtualization resources (e.g., a virtual application) to client process 420.

Server-side security service 440 may work with client-side security service 460 for authentication and for communicating the user credentials. For example, when authenticator 435 receives secured information (e.g., in an opaque container or as encrypted information) from client 405, authenticator 435 may query security service 440 for access to the secured information. In some embodiments, security service 440 may have a key to decrypt information received from client-side TCB 410. The secured information may include, for example, authentication information, which may be used (e.g., via a handshaking process) to authenticate server 425 and/or client 405. The secured information may also include, for example, secured user credentials secured by client-side security service 460. In some embodiments, server-side security service 440 may unsecure and send the user credentials (e.g., in a plaintext format) to authenticator 435. Authenticator 435 may validate a user based on the credentials by, for example, comparing the credentials with a local authentication database or other infrastructure connected to server 425 (e.g., LDAP server, RADIUS server, etc.).

Client 405 and server 425 may communicate via one or more channels 455, such as communication channels included in LAN 125, WAN 129, computer network 130, or any other network between the client and server. Channel 455 may facilitate communications between client process 420 and server 425 and may include any number of channels, including virtual channels. One or more channel may be reserved for transmission of opaque containers between credential provider 445/client-side security service 460 and authenticator 435/server-side security service 440.

FIG. 5 illustrates another example client 505 and server 525 environment for single sign-on in accordance with one or more illustrative aspects described herein. Similar to the example environment of FIG. 4, client 505 may include a trusted computing base 510 and an untrusted environment 515. Trusted computing base 510 may have several elements, including credential provider 545, credentials 550, and security service 560. Untrusted environment 515 may include a client process 520. Server 525 may include a trusted computing base 530. Several elements, including authenticator 535 and security service 540, may run within trusted computing base 530. Similar to the example environment of FIG. 4, client 505 and server 525 may communicate via one or more channels 555.

The example environment of FIG. 5 may include a second channel 565 for credential provider 545 to communicate directly with authenticator 535, instead of communicating with each other through client process 520. In some embodiments, credential provider 545 and authenticator 535 may rely on second channel 565 for authentication and/or credential exchange. For example, in SSO, credential provider 545 may directly send user credentials to authenticator 535 in order to permit client process 520 to utilize server 525 resources without requiring client 505 to provide user credentials a second time (e.g., after user credentials are provided a first time, such as when a user logs onto an OS session). In this example, because components in client-side TCB 510 and components in server-side TCB 530 communicate directly (e.g., not through an untrusted application, such as client process 520), the credentials do not leave the trusted computing base and therefore remain secured.

FIG. 6 illustrates an additional example client 605 and server 625 environment for single sign-on in accordance with one or more illustrative aspects described herein. Similar to the example environments of FIGS. 4 and 5, client 605 may include a trusted computing base 610 and an untrusted environment 615. Trusted computing base 610 may have several elements, including credential provider 645 and cached credentials 650. Different from the example environments of FIGS. 4 and 5, security service 665 may run within an untrusted environment 615, instead of TCB 610. Functionality of security service 665 will be described in further detail in the examples below with respect to FIG. 8.

Untrusted environment 615 may also include a client process 620 and user credentials 660. In some embodiments, client process 620 may request and/or receive a secured copy of cached credentials 650 (e.g., an encrypted version) from credential provider 645. The secured copy of credentials 650 may be stored within the untrusted environment as a copy 660.

Server 625 may include a trusted computing base 630. Several elements, including authenticator 635 and security service 640, may run within trusted computing base 630. Similar to the example environment of FIGS. 4 and 5, client 605 and server 625 may communicate via one or more channels 655.

FIG. 7 illustrates an example method of secure single sign-on in accordance with one or more illustrative aspects described herein. In some embodiments, the example method of FIG. 7 may correspond to the example client and server system of FIG. 4. In step 705, client 405 may receive user credentials. The credentials may be user provided as part of a login process, such as by a smart card or user entry via an I/O device 230. In some embodiments, the client may receive the credentials when a user logs into a logon (e.g., OS) session. For example, when the user initiates a WINDOWs session, client 405, via the WINDOWs session, may prompt the user for credentials, such as a username and password.

In step 710, credential provider 445 may intercept and/or store the user's credentials in order to enable SSO. Credential provider 445 may cache the credentials 450 at a location within TCB 410 to maintain security of the credentials. In some embodiments, credentials 450 may be stored in a secured (e.g., encrypted) format.

In step 715, credential provider 445 may receive a request for credentials from client process 420. In some embodiments, client process 420 may request the credentials after client process 420 is launched (e.g., either automatically launched by the OS or manually launched by user command) within an OS session. In some embodiments, client process 420 may request credentials when server 425 requests the credentials from client process 420. Therefore, in some embodiments, instead of generating a prompt (e.g., via a GUI) for user credentials to a user, client process 420 may request the credentials from credential provider 445 for SSO.

In step 720, client process 420 may be authenticated in response to a request for credentials. In some embodiments, credential provider 445 may authenticate client process 420. For example, credential provider 445 may request from the OS the path of the executable file associated with client process 420 (e.g., a path from which the client process was launched). Authentication of client process 420 may include several steps. First, credential provider 445 may verify the digital signature of the identified executable file. If credential provider 445 cannot verify the digital signature, the executable file might be corrupted by malware. Second, credential provider 445 may authenticate a certificate attached to the digital signature, such as by contacting a certificate authority (CA) to authenticate the certificate. If the CA does not vouch for an owner of the certificate, the owner might be a malware creator. Third, credential provider 445 may verify the integrity of executable code included in the executable file, such as by determining that the executable code has not been altered after it was digitally signed. If the executable code cannot be determined to be genuine, the executable code may have been altered by malware. Fourth, credential provider 445 may authorize the signer of the executable file by determining whether the owner of the signing certificate is trusted. If the signer cannot be authorized, a malware creator may have signed the certificate.

By authenticating client process 420, an added layer of security is incorporated into the SSO system. In some embodiments, if credential provider 445 cannot authenticate client process 420, the credential provider may refuse to converse with the client process because the client process might be infected by malware. For example, the credential provider 445 may refuse to converse with client process 420 if the digital signature is invalid or if the signing certificate cannot be authenticated because the executable image of the client process may be malware or may be infected by malware. In some embodiments, the credential provider 445 may refuse to converse with the client process 420 if the signer is not a trusted party because the signer may be an untrusted party such as a malware creator. While authenticating client process 420 is illustrated as directly following receiving the request for credentials step, authentication may occur at any time. In some embodiments, authentication occurs prior to TCB 410 sending credentials to server 425 (e.g., step 740, illustrated in FIG. 7), so that the credentials remain secure (e.g., located in TCB 410) until client process 420 is authenticated.

In step 725, credential provider 445 may query security service 460 for secured credentials. In some embodiments, the query initiates authentication of client 405 and/or server 425 (e.g., step 730) and initiates transfer of credentials to server 425 (e.g., step 740, as illustrated in FIG. 7). In some embodiments, credential provider 445 may include a copy of cached credentials 450 (e.g., "fresh credentials") with the query to security service 460. In other embodiments, security service 460 may know the location of credentials 450 such that the credential provider 445 might not include the cached credentials with the query. In these embodiments, security service 460 may independently obtain cached credentials 450 (e.g., "default credentials") from their storage location within TCB 410. For example, "default credentials" may be provided by WINDOWS CredSSP. In some embodiments, security service 460 may include information identifying the location of the cached credentials with the query.

In step 730, server 425 and/or client 405 may be authenticated. In some embodiments, client-side security service 460 and server-side security service 440 may generate and/or consume opaque containers for authentication. Generally, credential provider 445 (and client-side security service 460) and authenticator 435 (and server-side security service 440) may exchange opaque containers via client process 420 and/or channel 455. As previously described, security services 460 and 440 may rely on handshaking functionalities available to various cryptographic protocols, such as TLS, SSL, or any other secure tunneling protocol.

In step 735, security service 460 may secure the credentials. As previously described, security service 460 may create an opaque container having the encrypted user credentials contained therein. In some embodiments, the user credentials may be encrypted with any cryptographic protocol, such as TLS, SSL, Common Gateway Protocol, etc. Security service 460 may forward the secured credentials or otherwise indicate the location (e.g., within TCB 410) of the secured credentials to credential provider 445.

In step 740, credential provider 445 may send the secured credentials to authenticator 435. In some embodiments, the secured credentials may be sent via client process 420, which may have already established one or more communication channel 455 with authenticator 435. Because the credentials are secured prior to transfer to client process 420, the credentials have not left the trusted computing base unsecured. In this way, client process 420 may function as a dumb proxy that forwards opaque containers between client-side TCB 410 and server-side TCB 430. In some embodiments, client process 420 may utilize one or more preexisting channel (e.g., a data channel for communicating image information) for forwarding opaque containers. In other embodiments, client process 420 and server 425 may establish dedicated channels for forwarding opaque containers.

In step 745, authenticator 435 may query server-side security service 440 to access secured information (e.g., included in an opaque container). Security service 440 may have a key to decrypt information received from client-side TCB 410. The key may be a shared key with client-side security service 460. For example, the encryption key (e.g., utilized by client-side security service 460) and the decryption key (e.g., utilized by server-side security service 440) may be symmetrical. In some embodiments, the decryption key may be discarded after decrypting the credentials. In step 750, authenticator 435 and/or security service 440 may validate the credentials received from the client device. For example, the credentials may be compared to a database of user credentials to verify the user attempting access to server resources. Authenticator 435 and/or security service 440 may also validate the credentials by comparing (e.g., via a hash function) a hash of the credentials, such as in a plaintext format, with a database of user credential hashes. If a hash match exists, authenticator 435 may determine that the credentials are authentic.

Authenticator 435 and/or security service 440 may rely on other authentication protocols, such as Kerberos. For example, authenticator 435 may request a ticket granting ticket (TGT) from a Kerberos server (e.g., a Kerberos ticket granting server) using the credentials. If the Kerberos server returns a TGT in response to the request, authenticator 435 may determine that the credentials are valid. Furthermore, if a smart card was used in conjunction with a user providing credentials (e.g., a PIN), smart card redirection may be utilized to grant the Kerberos access to the smart card at client 405. A smart card redirection component may intercept all server-side requests to access the smart card and redirect the requests to client 405 via a virtual channel (e.g., a channel within communication channel 455). Based on this redirection, client 405 may service smart card requests on behalf of server 425. In step 755, server 425 may grant access to server resources (e.g., virtualization hardware, firmware, and/or software) to client process 420 upon validation of the credentials.

FIG. 8 illustrates another example method of secure single sign-on in accordance with one or more illustrative aspects described herein. In some embodiments, the example method of FIG. 8 may correspond to the example client and server system of FIG. 6. In some embodiments, prior to step 805 and similar to steps 705, 710, and 715, client 605 may receive credentials (e.g., when a user logs onto a logon session), credential provider 645 may intercept and/or store the credentials and/or credential provider 645 may receive requests for credentials, such as from client process 620.

In step 805, credential provider 645 may secure credentials 650 with a first security. For example, the credentials may be encrypted using a key accessible only to credential provider 645 and/or other components in trusted computing base 610. For example, server-side TCB 630 (or components included therein) might not have a decryption key for information encrypted using a first security. In step 810, credential provider 645 may send the secured credentials to client process 620. In some embodiments, client process 620 might not have a key to decrypt the credentials. Client process 620 may store the received secured credentials as copy 660.

In step 815, client process 620 may query security service 665 for secured credentials. In particular, client process 620 may request that secured credentials 660 be secured with a second security different from the first security. In step 820, security service 665 may unsecure the credentials 660 secured with a first security. For example, security service 665 may call a component, such as credential provider 645, within TCB 610 to unsecure (e.g., decrypt) the credentials. A key managed by credential provider 645 may be used to decrypt the credentials.

In step 825, security service 665 may re-secure the credentials with a second security. For example, the credentials may be wrapped in an opaque container and/or encrypted using a key accessible to client-side security service 665 and server-side security service 640. As previously described, the credentials may be encrypted with any cryptographic protocol, such as TLS, SSL, Common Gateway Protocol, etc. In some embodiments, the keys used by security service 665 and security service 640 may be symmetrical.

Security service 665 may forward the credentials secured with the second security to client process 620. In step 830, client process 620 may forward the secured credentials to authenticator 635 using one or more pre-existing and/or dedicated channel 655. In some embodiments, server 625 and/or client 605 may be authenticated, as previously discussed with respect to step 730, prior to sending the secured credentials.

After receiving the secured credentials, authenticator 635 may query server-side security service 640, as similarly described with respect to step 745, and the authenticator 635 and/or security service 640 may validate the user credentials and grant access to server 625 based on the validation, as similarly described with respect to steps 750 and 755.

Although example embodiments are described above, the various features and steps may be combined, divided, omitted, and/or augmented in any desired manner, and other steps may be added, depending on the specific recommendation process desired. The scope of this patent should only be defined by the claims that follow.

What is claimed is:
1. A method comprising:
receiving, at a client device, user credentials for performing single sign-on in a remote desktop environment;

intercepting, by the credential provider running in a trusted computing base of the client device, the user credentials;
caching the user credentials at a location within the trusted computing base;
receiving, by the credential provider, a request for the user credentials from a client process running on the client device;
sending, by the credential provider, the user credentials to a client security service running in the trusted computing base of the client device;
directly authenticating, by the client security service and a server security service, a server hosting a remote desktop program;
after authenticating the server, the client security service securing the user credentials for secure transmission to the server;
sending the secure user credentials, through the client process, to the server; and
granting, by the server and to the client process, access to the remote desktop program based on the secure user credentials.

2. The method of claim 1, wherein securing the user credentials comprises encrypting the user credentials based on a key agreed upon by the client security service and the server security service.

3. The method of claim 2, wherein granting access to the remote desktop program comprises:
querying the server security service to decrypt the encrypted user credentials; and confirming the validity of the user credentials.

4. The method of claim 1, wherein the client process is running in an untrusted session on the client device, and the method further comprises:
prior to sending the secure user credentials, authenticating the client process by the credential provider.

5. The method of claim 4, wherein authenticating the client process further comprises verifying, by the credential provider, a digital signature of an executable file associated with the client process.

6. The method of claim 1, wherein the client process executes in an untrusted session of an operating system on the client device.

7. The method of claim 1, wherein:
sending, by the credential provider, the user credentials to the client security service comprises sending, by the credential provider, a request for the client security service to authenticate the server; and
the client security service securing the user credentials further comprises encrypting the user credentials.

8. The method of claim 1, wherein the user credentials include a smart card pin.

9. One or more non-transitory computer-readable media storing computer-readable instructions that, when executed by a computing device, cause the computing device to:
receive, at a client device, user credentials for performing single sign-on in a remote desktop environment;
intercept, by a credential provider running in a trusted computing base of the client device, the user credentials;
cache the user credentials at a location within the trusted computing base;
receive, by the credential provider, a request for the user credentials from a client process running on the client device;
send, by the credential provider, the user credentials to a client security service running in the trusted computing base of the client device;
directly authenticate, by the client security service and a server security service, a server hosting a remote desktop program;
after authenticating the server, secure, by the client security service, the user credentials for secure transmission to the server;
send the secure user credentials, through the client process, to the server; and
access, by the client process, the remote desktop program based on the secure user credentials.

10. The one or more non-transitory computer-readable media of claim 9, wherein securing the user credentials comprises encrypting the user credentials based on a key agreed upon by the client security service and the server security service.

11. The one or more non-transitory computer-readable media of claim 9, wherein the client process is running in an untrusted session on the client device, and the one or more non-transitory computer-readable media storing additional computer-readable instructions that, when executed by the computing device, cause the computing device to:
prior to sending the secure user credentials, authenticate the client process by the credential provider.

12. The one or more non-transitory computer-readable media of claim 11, wherein authenticating the client process further comprises verifying, by the credential provider, a digital signature of an executable file associated with the client process.

13. The one or more non-transitory computer-readable media of claim 9, wherein the client process executes in an untrusted session of an operating system on the client device.

14. The one or more non-transitory computer-readable media of claim 9, wherein
sending, by the credential provider, the user credentials to the client security service comprises sending, by the credential provider, a request for the client security service to authenticate the server; and
the client security service securing the user credentials further comprises encrypting the cached user credentials.

15. The one or more non-transitory computer-readable media of claim 10, wherein the user credentials include a smart card pin.

16. A device comprising:
a processor; and
memory storing computer-readable instructions that, when executed by the processor, cause the processor to:
receive, at the device, user credentials for performing single sign-on in a remote desktop environment;
intercept, by a credential provider running in a trusted computing base of the device, the user credentials;
cache the user credentials at a location within the trusted computing base;
receive, by the credential provider, a request for the user credentials from a client process running on the device;
send, by the credential provider, the user credentials to a client security service running in the trusted computing base of the device
directly authenticate, by the client security service, a server hosting a remote desktop program;
after authenticating the server, secure, by the client security service, the user credentials for secure transmission to the server;
send the secure user credentials, through the client process, to the server; and access, by the client process, the remote desktop program based on the server granting access based on the secure user credentials.

17. The device of claim 16, wherein securing the user credentials by the processor comprises encrypting the user credentials based on a key agreed upon by the client security service and a server security service.

18. The device of claim 17, wherein the client process is running in an untrusted session on the device, and the memory stores additional computer-readable instructions that, when executed by the processor, cause the processor to:
prior to sending the secure user credentials, authenticate, by the credential provider, the client process by verifying a digital signature of an executable file associated with the client process.

* * * * *